United States Patent
Kroening et al.

(10) Patent No.: US 9,166,267 B2
(45) Date of Patent: Oct. 20, 2015

(54) MODULAR FERRITE SWITCH FOR CONSTRUCTING SWITCH NETWORKS

(71) Applicant: Honeywell International Inc., Morristown, NJ (US)

(72) Inventors: Adam M. Kroening, Atlanta, GA (US); Todd Vaughn, Lawrenceville, GA (US)

(73) Assignee: Honeywell International Inc., Morristown, NJ (US)

( * ) Notice: Subject to any disclaimer, the term of this patent is extended or adjusted under 35 U.S.C. 154(b) by 196 days.

(21) Appl. No.: 13/923,497

(22) Filed: Jun. 21, 2013

(65) Prior Publication Data

US 2014/0320227 A1 Oct. 30, 2014

Related U.S. Application Data

(60) Provisional application No. 61/817,145, filed on Apr. 29, 2013.

(51) Int. Cl.
| | |
|---|---|
| *H01P 1/32* | (2006.01) |
| *H01P 1/38* | (2006.01) |
| *H04B 1/04* | (2006.01) |
| *H04B 1/18* | (2006.01) |
| *H01P 1/39* | (2006.01) |

(52) U.S. Cl.
CPC .. *H01P 1/38* (2013.01); *H01P 1/39* (2013.01); *H04B 1/0458* (2013.01); *H04B 1/18* (2013.01)

(58) Field of Classification Search
CPC ............... H01P 1/32; H01P 1/36; H01P 1/38; H01P 1/383
USPC .................................................. 333/1.1, 24.2
See application file for complete search history.

(56) References Cited

U.S. PATENT DOCUMENTS

| | | | |
|---|---|---|---|
| 4,061,989 A | 12/1977 | Petrelis | |
| 4,109,202 A | 8/1978 | Kudsia et al. | |
| 4,688,259 A | 8/1987 | Edridge | |
| 6,885,257 B2 | 4/2005 | Kroening | |
| 7,049,900 B2 | 5/2006 | Kroening | |

(Continued)

OTHER PUBLICATIONS

European Patent Office, "Office Action from EP Application No. 14164656.2 mailed Nov. 4, 2014", "from Foreign Counterpart of U.S. Appl. No. 13/923,497", Nov. 4, 2014, pp. 1-5, Published in: EP.

(Continued)

*Primary Examiner* — Stephen E Jones
(74) *Attorney, Agent, or Firm* — Fogg & Powers LLC (57) ABSTRACT

Systems and methods for a modular ferrite switch for constructing switch networks are provided. In one implementation, a circulator redundancy network comprises multiple inputs; multiple outputs; and multiple circulator modules that connect the inputs to the outputs. A circulator module includes at least one module input connected to at least one input; at least one module output, where the number of module outputs equals the number of module inputs; multiple interconnection ports, configured to connect the circulator module to other circulator modules; and multiple circulators that route received signals between the at least one input, the at least one output, and the interconnection ports. Further, multiple interconnects connect the plurality of circulator modules to one another at the interconnection ports; and a circulator switch controller controls the direction of circulation for the plurality of circulators.

20 Claims, 9 Drawing Sheets

(56) References Cited

U.S. PATENT DOCUMENTS

2003/0107447 A1     6/2003    Kroening
2011/0248796 A1    10/2011    Pozgay

OTHER PUBLICATIONS

European Patent Office, "European Search Report from EP Application No. 14164656.2 mailed Oct. 24, 2014", "from Foreign Counterpart of U.S. Appl. No. 13/923,497", Oct. 24, 2014, p. 1/3, Published in: EP.

Burrows, "Technical Report 639: Design of Microwave Beam-Switching Networks", Dec. 1983, pp. 1-83, Publisher: Lincoln Laboratory, Massachusetts Institute of Technology.

Liang et al., "Integrated Redundancy Ring Based on Modular Approach", "26th International Communications Satellite Systems Conference (ICSSC)", Jun. 10-12, 2008, pp. 1-7, Publisher: American Institute of Aeronautics and Astronautics, Published in: San Diego, CA.

MODULAR FERRITE SWITCH FOR CONSTRUCTING SWITCH NETWORKS

CROSS-REFERENCE TO RELATED APPLICATIONS

This application claims the benefit of U.S. Provisional Application No. 61/817,145, filed on Apr. 29, 2013, which is incorporated herein by reference in its entirety.

BACKGROUND

In certain communication networks, certain communication nodes in the network are not easily accessible for repairs in the event that equipment on the communication node experiences a failure. For example, communication nodes located in space are practically inaccessible and, as such, that failed equipment cannot be repaired. To prevent the failures from affecting the operation of the communication node, the communication equipment on the communication node includes standby equipment that increases the redundancy of any communication paths through the communication equipment. To control which communication paths are used through the communication equipment, a switch network is used to switch a communication path from failed equipment to standby equipment.

In at least one example, low noise amplifiers are prone to failures. Thus, a communication node will include a number of spare amplifiers. For example, at any given time, the communication node may use at most M amplifiers. The communication equipment may include N amplifiers such that when any of the M amplifiers experiences a failure, the switch network switches the communication path through one of the N amplifiers that is not currently active and switches the communication path away from the amplifier that failed. This redundant configuration of amplifiers and switch networks may be referred to as N for M redundancy.

In certain implementations, a switch network can be implemented using a network of switching ferrite circulators. One configuration of ferrite circulators that offers N for M redundancy for connecting N input ports to M output ports is known as order constrained networks. An order constrained network of circulators allows that any M of the N input ports can be connected to the M output ports. However, order constrained networks can be complex, such that switching networks have a different design for different combinations of N and M. Thus, the order constrained network generally fails to provide the opportunity to reuse previously designed switch networks that implement ferrite circulators.

SUMMARY

Systems and methods for a modular ferrite switch for constructing switch networks are provided. In certain embodiments, a circulator redundancy network includes a plurality of inputs; a plurality of outputs; a plurality of circulator modules configured to connect the plurality of inputs to the plurality of outputs, wherein a circulator module in the plurality of circulator modules comprises: at least one module input connected to at least one input in the plurality of inputs; at least one module output, wherein the number of module outputs in the at least one module output equals the number of module inputs in the at least one module input; a plurality of interconnection ports, configured to connect the circulator module to other circulator modules in the plurality of circulator modules; and a plurality of circulators configurable to route received signals between the at least one input, the at least one output, and the plurality of interconnection ports. The circulator redundancy network further includes a plurality of interconnects configured to connect the plurality of circulator modules to one another, wherein an interconnect connects to an interconnection port; and a circulator switch controller, configured to control the direction of circulation for the plurality of circulators in the plurality of circulator modules.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

In the present disclosure, various implementations are described for providing circulator modules that can be connected to one another to form N for M redundancy networks.

The different circulator modules are connected to one another using short waveguide segments between interconnection ports. Further, matched loads are used on any unneeded ports and unconnected interconnection ports. For example, a circulator module may have N/2 input ports and N/2 output ports. When two of the circulator modules are connected together using short waveguide segments between interconnection ports, the resulting network has N input ports and N output ports and multiple unconnected interconnection ports. The network may be configured into an N for M redundancy network by terminating the unconnected interconnection ports and N−M output ports with matched loads. By using circulator modules to form redundancy networks, the same circulator module designs can be used for different N for M configurations in different redundancy networks.

Figure 1:
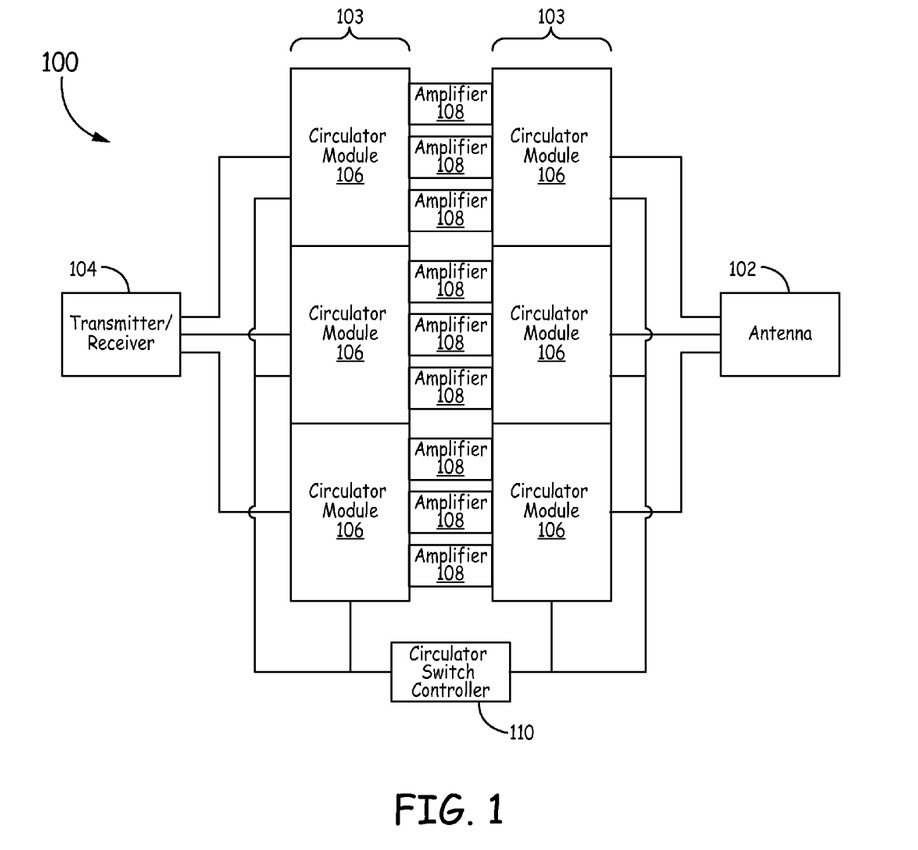
FIG. 1 is a block diagram of a redundant switching network in one embodiment described in the present disclosure.

FIG. 1 is a block diagram of a portion of a system 100 that implements redundancy networks that are fabricated from circulator modules. In one implementation as shown, system 100 is part of a communication node that transmits and receives signals. For example, the system 100 receives a signal through an antenna 102. The signal is amplified by at least one amplifier 108 and then processed by a transmitter/receiver 104. In at least one implementation the amplifier 108 may be a low noise amplifier, a power amplifier, a travelling wave tube amplifier, or the like. Also, in certain implementations, the transmitter/receiver 104 provides a signal that is amplified by the amplifiers 108 and then provided to the antenna 102 for radiation to another communication node in the communication network. In certain embodiments, the system 100 is implemented on a platform that is inaccessible for repairs when a component on the system experiences a fault. For example, the system 100 may be implemented on a satellite located in space or other inaccessible location. In at least one embodiment, an amplifier 108 in the system 100 may experience a failure during the life of the system 100. To prevent the failure from negatively affecting the operation of the system 100, when the system 100 begins operation, the system 100 may include multiple amplifiers 108, where a portion of the amplifiers 108 function as standby amplifiers in the event that an operating amplifier fails. When an operating amplifier fails, a switching network 103 changes a communication path that passes through the failed LNA to pass through a standby LNA. As shown in FIG. 1, the amplifiers 108 are used as example of electronic components, where the input/output ports of the components may connect to other components through transmission media that includes waveguides, microstrip, coaxial, and the like. In at least one implementation, the components may connect to other components via adapters that allow the component to interface with other components fabricated in a different transmission media. It is intended that the switching network 103, as described herein, can be used to change electrical paths through an operating component to a standby component.

In certain implementations, the switching network 103 is comprised of circulator modules 106. A circulator module 106 is a modular network of circulators that can be interconnected with one another to create the larger switching network 103. In at least one embodiment, a circulator module 106 contains multiple ferrite circulators that are connected to one another to provide switching capabilities between a number of module inputs and module outputs. In certain implementations, the ferrite circulators in a circulator module 106 may be waveguide circulators, where each circulator has three arms arranged at 120° that meet in a common junction. The common junction may be loaded with a non-reciprocal material such as ferrite. When a magnetizing field is created in the ferrite element that is located at the common junction, a gyromagnetic effect can be used to switch the microwave signal from one waveguide arm to another. By reversing the direction of the magnetizing field, the direction of switching between the waveguide arms is reversed. Thus, a switching circulator is functionally equivalent to a fixed-bias circulator but has a selectable direction of circulation. RF energy can be routed with low insertion loss from one waveguide arm to either of the two outputs arms. If one of the waveguide arms is terminated in a matched load, then the circulator acts as an isolator, with high loss in one direction of propagation and low loss in the other direction. Reversing the direction of the magnetizing field will reverse the direction of high and low isolation.

In certain embodiments, to control the direction of magnetization for the ferrite circulators in the different circulator modules 106, the system 100 includes a circulator switch controller 110. The circulator switch controller 110 sends electrical signals to the individual circulators that control the direction of circulation for each circulator. For example, the circulator switch controller 110 sends a high current pulse to a particular circulator that changes the direction of circulation in that circulator. In certain implementations, the circulator switch controller 110 includes a separate driver that is associated with each circulator in the system 100, where the driver provides a switching signal to an individual circulator. In at least one other implementation, where switching time is not critical, the circulator switch controller 110 may include a single driver that is multiplexed to the separate circulators in the circulator module 106. In a further embodiment, the circulator switch controller includes an interface that allows a user to control the switching directly through another device.

The circulator modules 106 include multiple ferrite elements that typically have impedance-matching transitions between each ferrite element. For example, a conventional waveguide circulator may transition from one ferrite element to a dielectric-filled waveguide such as a quarter-wave dielectric transformer structure, to an air-filled waveguide, and then back to another dielectric-filled waveguide section and the next ferrite element. The dielectric transformers are typically used to match the lower impedance of the ferrite element to that of an air-filled waveguide.

As stated above, a circulator module 106 may contain multiple waveguide circulators. Further, the circulator module 106 may also include multiple load elements for isolation of certain ports in some of the ferrite circulators, where the multiple load elements are designed to match the impedance of an air-filled waveguide interface. The circulators and load elements can be connected in various configurations according to the modular design of the circulator module 106. In certain implementations, the number of desired standby components in the system determines the type of modular design that is used to design a particular circulator module. For example, a system 100, having N amplifiers 108 where M amplifiers 108 are operational at any given time, provides switching so that N−M standby amplifiers 108 can be switched into the communication paths in system 100 such that there are always M communication paths available between the transmitter/receiver 104 and the antenna 102. As N−M increases, the size of the corresponding circulator module 106 also gradually increases.

Figure 2A:
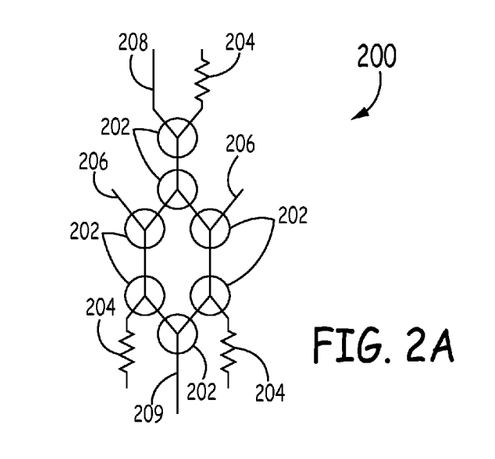
FIGS. 2A and 2B illustrate a schematic for a circulator module and the implementation of the circulator module in a switching network in one embodiment described in the present disclosure.

FIGS. 2A-7B illustrate different embodiments of a circulator module 106 in FIG. 1. FIG. 2A illustrates a circulator module 200 and FIG. 2B illustrates a redundancy network 210 that is formed by combining the circulator module 200 to other circulator modules 200. As illustrated, the circulator module 200 includes multiple circulators 202 and multiple matched loads 204 that terminate waveguide sections. Further, each circulator module 200 includes interconnection ports 206. The interconnection ports 206 may include short pieces of waveguide that allow signals to pass from one circulator module 200 to another circulator module 200.

As illustrated, circulator module 200 may be implemented in certain systems where there are at most two standby components, such that N−M is equal to 2. When N−M is equal to 2, the circulator module 200 may have a simpler design such that waveguide paths are not crossed, thus allowing the circulator module 200 to have a smaller size and lower insertion loss. In at least one exemplary implementation, a signal is transmitted into the circulator module 200 through module input 209, interconnection ports 206, or module output 208, whereupon the circulators 202, in the circulator module 200, circulate the received signal between the module output 208, a interconnection port 206, or a matched load 204.

Figure 2B:
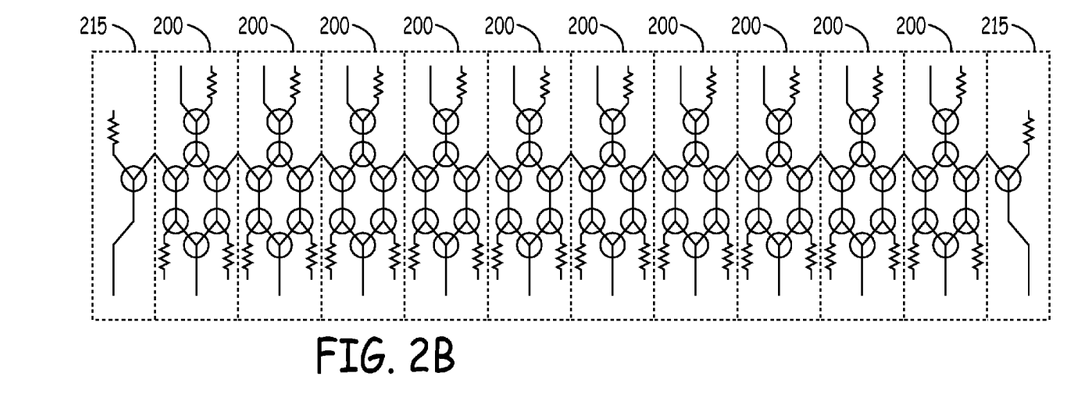

FIG. 2B illustrates a redundancy network 210 fabricated from multiple circulator modules 200 as described in FIG. 2A. As illustrated the redundancy network 210 includes 12 inputs and 10 outputs, thus as there are 12 inputs and 10 outputs, the redundancy network is able to provide 10 separate communication paths through the redundancy network at a time. In certain implementations, the 12 inputs are each connected to a separate component, where ten of the 12 components are operational. When the redundancy network initially begins operating, the 2 components that are not operational are standby components. When one of the ten operational components experiences a failure, the redundancy network 210 switches the communication paths from the failed component to one of the standby components.

In certain implementations, when the redundancy network 210 has N−M=2 redundancy, as can be seen in the redundancy network 210, the redundancy network 210 includes modified circulator modules 215. A modified circulator module 215 is formed by removing module output 208 from a circulator module 200 and removing circuitry that becomes superfluous with the removal of module output 208. As shown in FIG. 2B, modified circulator module 215 is an exemplary implementation of a modified circulator module. Other configurations may be used, where some of the configurations include superfluous circulators and other components. Any open waveguide sections that are formed by the removal of circuitry may be terminated with a matched load 204. As shown, in the redundancy network 210, a signal that is received through a module input of the modified circulator module 215 is circulated into the neighboring circulator module 200. Conversely, any signal that is circulated into the modified circulator module 215 from a neighboring circulator module 200 is circulated into a matched load 204.

Figure 3A:
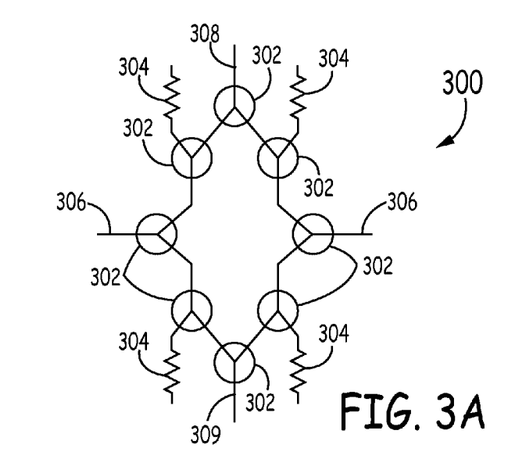
FIGS. 3A and 3B illustrate a schematic for a circulator module and the implementation of the circulator module in a switching network in one embodiment described in the present disclosure.
Figure 3B:
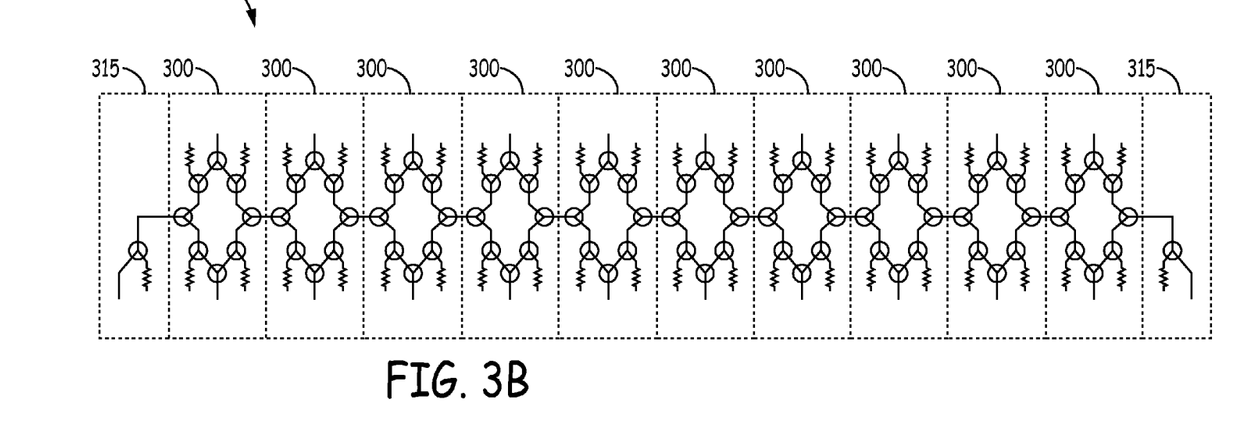

FIG. 3A illustrates another embodiment of a circulator module 300 and FIG. 3B illustrates another embodiment of a redundancy network 310, where the redundancy network 310 is formed by combining the circulator module 300 to other circulator modules 300. Like the circulator module 200 in FIG. 2A, the circulator module 300 is configured for N−M=2 redundancy as the waveguides in the circulator module 300 do not cross over. Also, circulator module 300 includes multiple circulators 302 and multiple matched loads 304 that terminate sections of waveguides to isolate signals that may propagate in a wrong direction. Circulator module 300 functions as an alternative implementation to circulator module 200 in FIG. 2A for forming N−M=2 redundancy networks. For example, FIG. 3B illustrates an N−M=2 redundancy network 310 that includes circulator modules 300 and modified circulator modules 315, where the modified circulator modules 315 are designed in a like manner as modified circulator modules 215 in FIG. 2B. As illustrated, circulator modules 200 and 300 are only examples of circulator modules that can be formed that lack crossing waveguides. Other circulator modules that lack crossing waveguides may be designed that can be formed into N−M=2 redundancy networks.

Figures 4A, 4B:
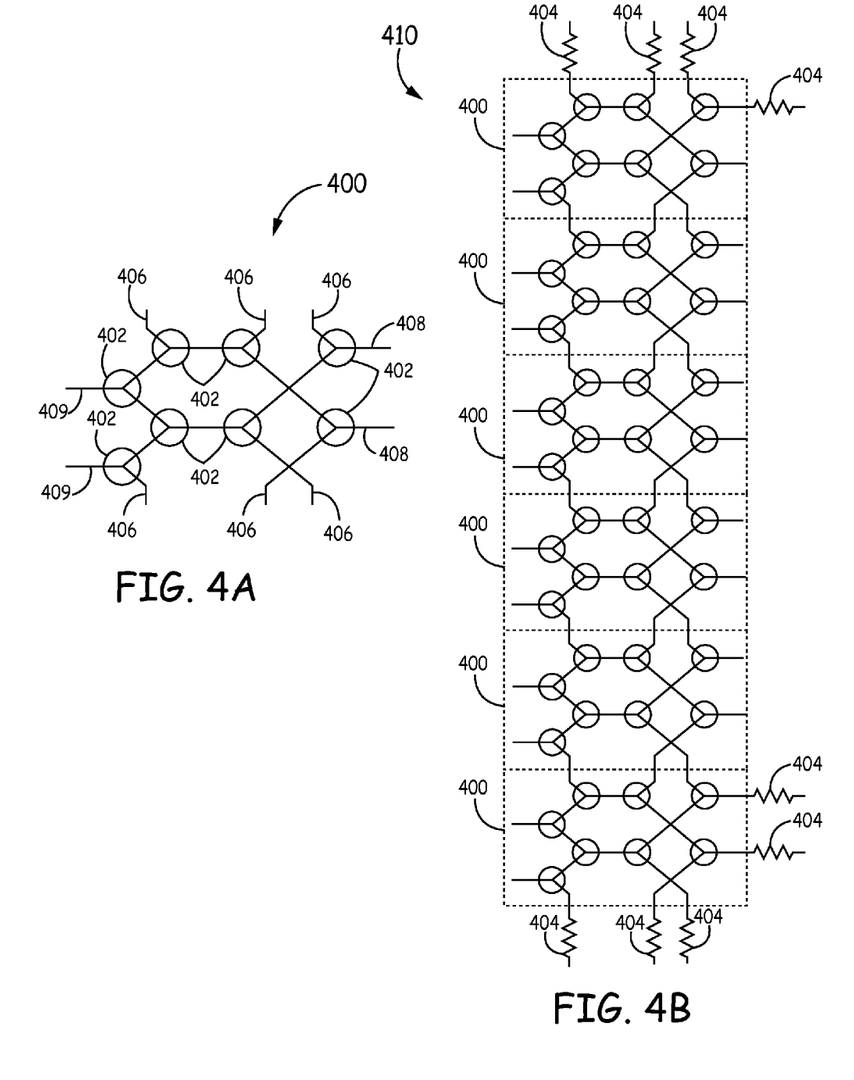
FIGS. 4A and 4B illustrate a schematic for a circulator module and the implementation of the circulator module in a switching network in one embodiment described in the present disclosure.

In certain implementations, circulator modules may be designed that can be combined to form N−M>2 redundancy networks. However, circulator modules that can be combined to form N−M>2 redundancy networks also have waveguide cross-over paths. Because the waveguides cross over, the module uses more space when implemented in a design. FIGS. 4A and 4B illustrate a circulator module 400 that can be used to form redundancy networks when N−M=2 and N−M=3. In contrast to the circulator modules of FIGS. 2A and 3A, the circulator module 400 has two module inputs 409 and two module outputs 408. Further, the circulator module 400 includes multiple interconnection ports 406 such that the circulator module 400 has multiple interconnects between the circulator module 400 and an adjacent circulator module. The multiple interconnects and the waveguide cross over path enable the higher redundancy that is permitted by the circulator module 400. In an alternative implementation, modules that permit higher redundancy are possible for N−M>3 by adding more circulators. However, circulator modules capable of forming N−M>3 redundancy modules include more circulators and cross over paths.

FIG. 4B illustrates a redundancy network 410 formed from circulator modules 400. As illustrated, redundancy network 410 is a 12 for 9 redundancy network such that N−M=3. In certain implementations, and in contrast to redundancy networks 210 and 310 where superfluous circulators were removed, in redundancy network 410, excess module outputs 408 and excess interconnection ports 406 that do not connect to other modules or other components external to the redundancy network 410 are terminated by a matched load 404. As only matched loads are added to the redundancy network 410 according to the number of outputs of the redundancy network 410, the separate circulator modules 400 are merely joined together with waveguides to provide the desired redundancy.

Figures 5A, 5B:
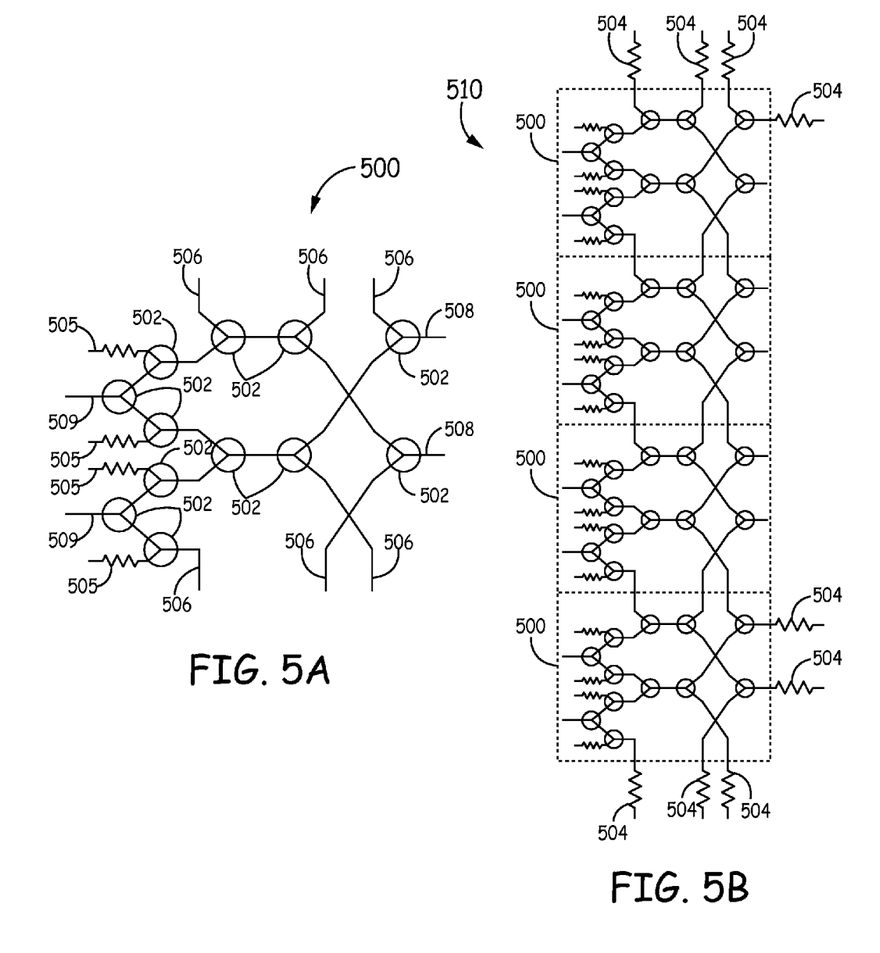
FIGS. 5A and 5B illustrate a schematic for a circulator module and the implementation of the circulator module in a switching network in one embodiment described in the present disclosure.
Figures 6A, 6B:
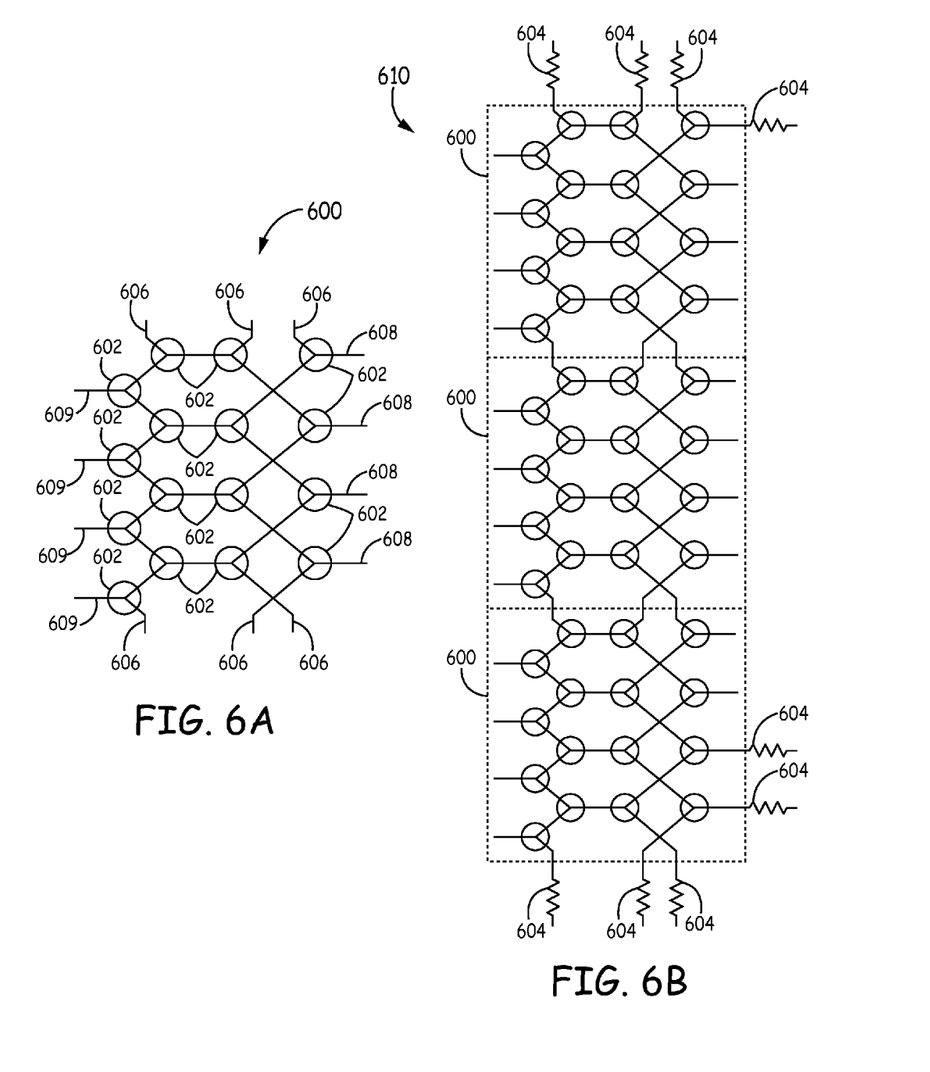
FIGS. 6A and 6B illustrate a schematic for a circulator module and the implementation of the circulator module in a switching network in one embodiment described in the present disclosure.

FIGS. 5A and 5B illustrate a circulator module 500 and redundancy network 510 that, in certain embodiments, function similarly to circulator module 400 and redundancy network 410 in FIGS. 4A and 4B and the description of circulator module 400 and redundancy network 410 in FIGS. 4A and 4B describes circulator module 500 and redundancy network 510 in FIGS. 5A and 5B. However, circulator module 500 includes additional circulators with input matched loads 505, thereby forming isolators. The input matched loads 505 prevent signals that are transmitted into the circulator module 500 from being reflected out of the circulator module 500. For example, a circulator 502 in the circulator module 500 may not exactly match the impedance of a connecting waveguide. Due to the impedance mismatch, the circulator 502 will reflect some of the signal. The circulator module 500 circulates the reflected signal to the input matched loads 505, which input matched loads absorb the reflected signal. FIGS. 6A and 6B illustrate a circulator module 600 that has four module inputs and four module outputs that is implemented in a redundancy network 610. The circulator module 600 functions similarly to the combination of two of the two input/two output circulator module 400 described in relation to FIG. 4A. In particular, the module inputs 609, module outputs 608, circulators 602 and interconnection ports 606 function similarly to module inputs 409, module outputs 408, circulators 402, and interconnection ports 406. As such the four module input and four module output circulator module 600 may be used to form redundancy networks where N−M≤3 like redundancy network 610. In at least one further implementation, a four module input and four module output circulator module 600 can be combined with a two module input and two module output circulator module 400 or other size circulator module. As illustrated by the above example embodiments, various circulator modules can be designed that decrease the cost of designing a redundancy network. Further, the above illustrated redundancy networks are for redundancy networks where N−M≤3. Other designs for circulator modules can be designed that allow N−M to be greater than three.

Figure 7A:
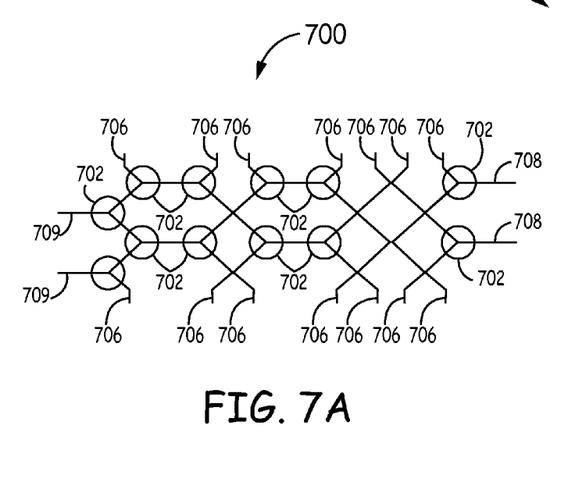
FIGS. 7A and 7B illustrate a schematic for a circulator module and the implementation of the circulator module in a switching network in one embodiment described in the present disclosure.
Figure 7B:
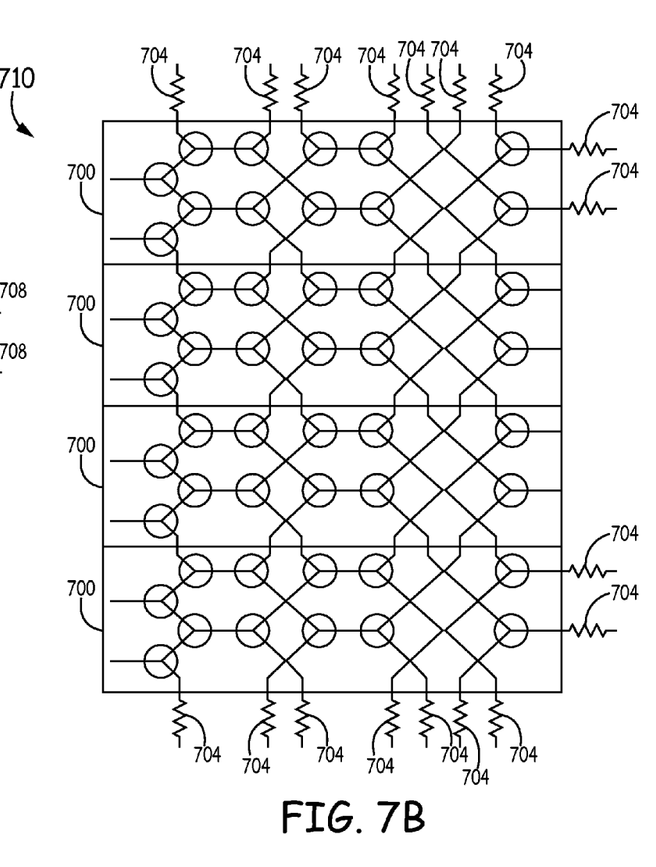

In certain implementations, circulator modules may be designed that can be combined to form N−M>3 redundancy networks. However, circulator modules that can be combined to form N−M>3 redundancy networks also have more waveguide cross-over paths than redundancy networks where N−M≤3. FIGS. 7A and 7B illustrate a circulator module 700 that can be used to form redundancy networks when N−M≤7. As illustrated, the exemplary circulator module 700 has two module inputs 709 and two module outputs 708. Further, the circulator module 700 includes multiple interconnection ports 706 such that the circulator module 700 has multiple interconnects between the circulator module 700 and adjacent circulator modules. The multiple interconnects and the waveguide cross over path enable the higher redundancy that is permitted by the circulator module 700.

FIG. 7B illustrates a redundancy network 710 formed from circulator modules 700. As illustrated, redundancy network 710 is an 8 for 4 redundancy network such that N−M=4. In certain implementations, as shown in redundancy network 710, excess module outputs 708 and excess interconnection ports 706 that do not connect to other modules or other components external to the redundancy network 710 are terminated by a matched load 704. As only matched loads are added to the redundancy network 710 according to the number of outputs of the redundancy network 710, the separate circulator modules 700 are merely joined together with waveguides or other transmission media to provide the desired redundancy.

Figure 8:
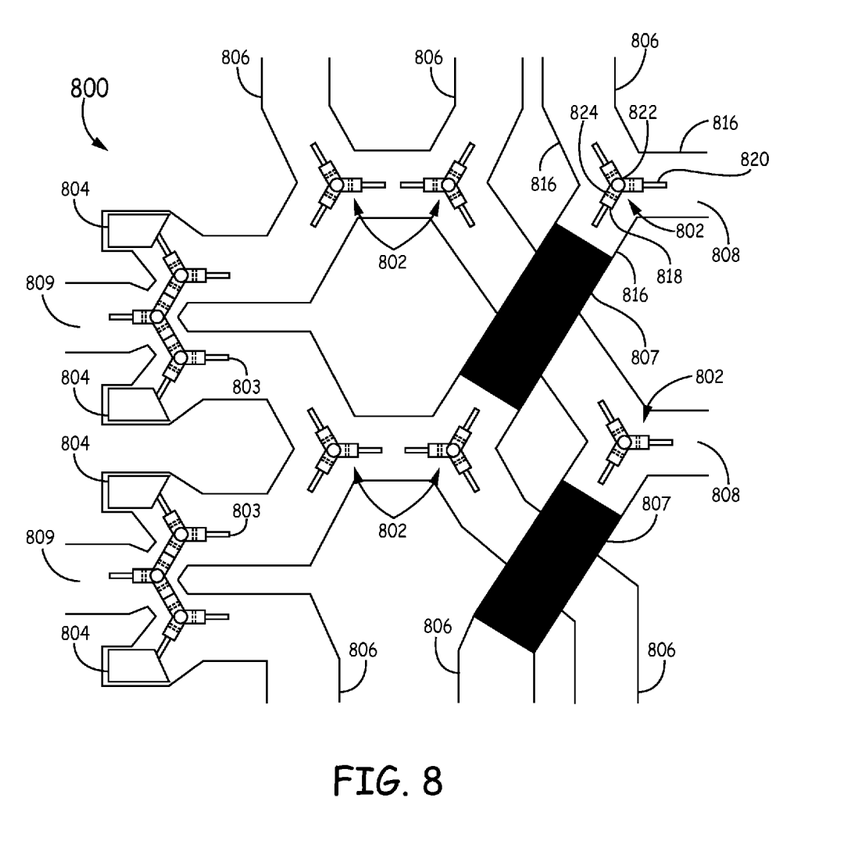
FIG. 8 illustrates a circulator module in one embodiment described in the present disclosure.

FIG. 8 is a diagram illustrating a waveguide view of one implementation of a circulator module 800. In at least one implementation, the circulator module 800 functions similarly to circulator module 500 in FIG. 5A. For example, the circulators 802, interconnection ports 806, the module outputs 808, the module inputs 809, and matched loads 804 function as circulators 502, interconnection ports 506, the module outputs 508, the module inputs 509, and matched loads 504 described above in relation to FIG. 5A. In at least one implementation, circulator module 800 includes a waveguide cross-over 807. The waveguide cross-over segment 807 is a portion of the circulator module 800, where one waveguide transitions to a different E-plane while crossing another waveguide, where the E-plane is defined as the plane containing the electric field vector of the dominant electromagnetic wave in the waveguides. For example, a first waveguide segment and a second waveguide segment lie in a first E-plane. To cross the first waveguide segment over the second waveguide segment, the first waveguide segment transitions to a waveguide cross-over segment 807 in a second E-plane while crossing the second waveguide segment. When the first waveguide segment has crossed the second waveguide segment, the first waveguide segment transitions back to the first E-plane. In at least one further implementation, when the circulator module 800 is connected to other circulator modules 800 to form a redundancy network, the circulator modules 800 may lie in different E-planes and waveguide interconnects that connect the circulator modules 800 to one another may transition the signals that propagate in the circulator modules 800 to circulator modules 800 that lie in different E-planes.

In at least one implementation, multiple circulators can be formed as a triad switch 803. The triad switch 803 includes a single switching circulator and two switching or non-switching isolators. The isolators are added to the switch so that the impedance match for any one port is independent of the impedance match on the other ports. Any signal reflections generated by mismatches at the other ports are absorbed in the matched load elements that are part of the isolators. As illustrated, the triad switch 803 includes three ferrite elements that are configured in a manner so that at least one leg of each ferrite element is adjacent to one leg of a neighboring ferrite element. Triad switch 803 is described in greater detail in U.S. Pat. No. 6,885,257 titled "MULTI-JUNCTION WAVEGUIDE CIRCULATOR WITHOUT INTERNAL TRANSITIONS", which is herein incorporated by reference.

In certain implementations, a circulator 802 is comprised of a ferrite switching element 818 that is made from a non-reciprocal material such as a ferrite. Magnetic fields created in switching element 818 can be used to circulate a microwave signal that propagates in a waveguide arm 816 to propagate in another waveguide arm 816 connected to the circulator 802. The reversing of the direction of the magnetic field created in the switching element 818 reverses the direction of circulation within the switching element 818. The reversing of the direction of circulation within the switching element 818 also switches which waveguide arm 816 propagates the signal away from the switching element 818. In at least one exemplary embodiment, a circulator 802 is connected to three waveguide arms 816, where one of the waveguide arms 816 functions as an input arm and two waveguide arms 816 function as output arms. The input waveguide arm 816 propagates microwave energy into the circulator 802, where the circulator 802 circulates the microwave signal through switching element 818 and out one of the two output waveguide arms 816. In one implementation, when the magnetic fields are changed, the microwave signal is circulated through the switching element 818 and out the other of the two output waveguide arms 816. Thus, a switching element 818 has a selectable direction of circulation. RF energy received through one waveguide arm 816 can be routed with a low insertion loss from the one waveguide arm 816 to either of the other output waveguide arms 816.

In certain implementations, segments of switching element 818 protrude into the separate waveguide arms 816. For example, switching element 818 can be a Y-shaped switching element 818. However, switching element 818 can be other shapes as well, such as a triangular puck, a cylinder, and the like. In at least one implementation, switching element 818 is a switchable or latchable ferrite circulator. To make switching element 818 switchable, H-plane magnetizing windings are threaded through H-plane apertures 824 in the segments of switching element 818 that protrude into the separate waveguide arms 816, where the H-plane apertures 824 are parallel to the H-plane, where the H-plane is defined as the plane containing the magnetic field vector of the dominant electromagnetic wave in each waveguide arm 816. H-plane apertures 824 are created by boring a hole through a segment of the switching element 818 that protrudes into each separate waveguide arm 816 and then threading H-plane magnetizing windings through the H-plane apertures 824. In one implementation, H-plane magnetizing windings are threaded into the circulator 802 and carry signals from a circulator switch controller, such as circulator switch controller 110 in FIG. 1. H-plane magnetizing winding allows for the control and establishment of an out-of-plane magnetic field in switching element 818, where a portion of the out-of-plane magnetic field is not parallel with the H-plane in a resonant section of the switching element. The polarity of the magnetic field can be switched back-and-forth by the application of current on a magnetizing winding to create a switchable circulator. For example, the application of a pulse with a current between 4 and 12 amperes to a magnetizing winding through aperture 824 magnetizes switching element 818 such that switching element 818 circulates RF energy received on an input waveguide arm 816 to one of the two remaining waveguide arms 816. Applying a current in the opposite direction through a magnetizing winding switches the direction of magnetization such that switching element 818 circulates RF energy received on the input waveguide arm 816 to the other remaining waveguide arms 816. Further, the portion of switching element 818 where the three segments of the element converge and to the inside of the three H-plane apertures 824 is a resonant section of the switching element 818. The dimensions of this section determine the operating frequency for circulation in accordance with conventional design and theory. The three protruding sections, or legs of switching element 818 towards the outside of H-plane apertures 824 act both as return paths for the bias fields in resonant section and as impedance transformers out of the resonant section. In an alternative implementation, the switching element 818 is magnetized by a magnetic field that is formed by an external component. Further, where a circulator will always circulate signals in the same direction, a non-switching circulator may be used.

In certain implementations, a quarter wave dielectric transformer 820 is attached to the ends of switching element 818 that are farthest away from the middle of the switching element 818. The quarter wave dielectric transformers 820 aid in the transition from a switching element 818 to an air-filled waveguide arm 816. Dielectric transformers 820 are typically used to match the lower impedance of a switching element 818 to that of the air-filled waveguide arms 816. In alternative implementations, switching element 818 transitions to the air-filled waveguide arm 816 without an aiding dielectric transformer 820. To transition directly, without an aiding transformer, from switching element 818 to the air-filled waveguide arm 816, switching element 818 may be designed so that the impedance of the switching element 818 matches the impedance of the air-filled waveguide arm 816. For example, the switching element 818 is designed to be narrower than corresponding switching elements that are designed to interface with dielectric transformers 820. Further, the material that is used to fabricate the switching element 818 is selected to have a particular saturation magnetization value, such that the impedance of the switching element 818 matches the impedance of the air filled waveguide arm 816.

In further embodiments, a top dielectric spacer 822 is disposed on the top surface of switching element 818 that is parallel to the H-plane. Spacer 822 is used to position switching element 818 in the waveguide housing and to provide a thermal path out of switching element 818 for high power applications. Generally, two dielectric spacers 822 can be used, located on opposite sides of the switching element 818. All of the components described above are disposed within the waveguide circulator 802. The waveguide circulator 802 is generally air-filled other than the ferrite element, transformers, spacers, winding, and the like, and also includes waveguide input/output arms 816 that provide interfaces for signal input and output.

Figure 9:
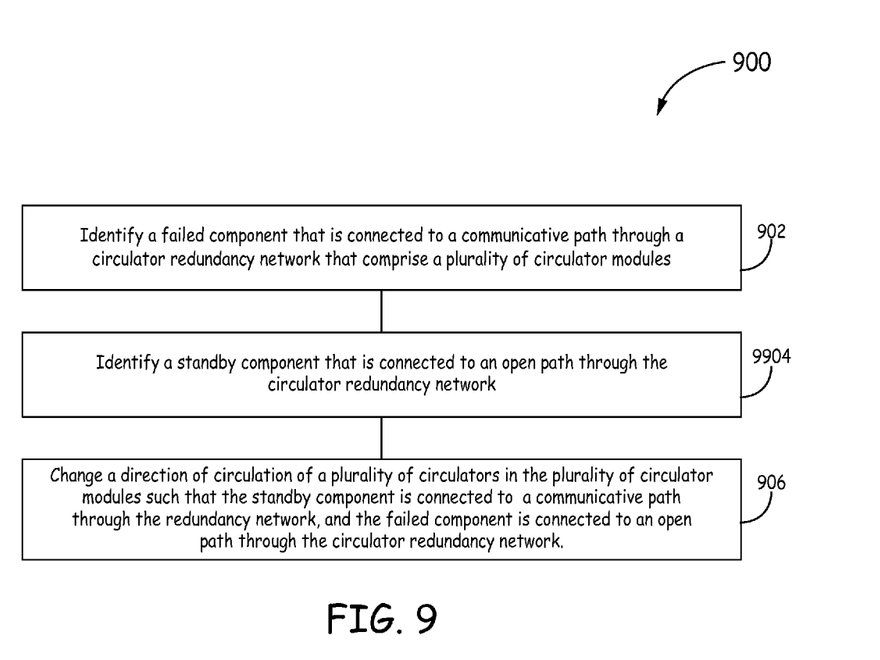
FIG. 9 is a flow diagram for a method for switching communication paths through a circulator redundancy network in one embodiment described in the present disclosure.

FIG. 9 is a flow diagram of a method 900 for switching communication paths through a circulator redundancy network. Method 900 proceeds at 902, where a failed component is identified, where the failed component is connected to a communicative path through a circulator redundancy network that comprises a plurality of circulator modules. For example, a communication node may have multiple LNAs, where some of the LNAs are standby LNAs in the event an operation LNA fails. Further, the operational LNA may connect to other components on the communication node through a circulator redundancy network. During the operation of the communication node, the communication node may monitor the operational LNAs to determine when a failure occurs.

In certain implementation, when a failed component is identified, method 900 proceeds at 904, where a standby component is identified, where the standby component is connected to an open path through the circular redundancy network. Method 900 then proceeds at 906 where a direction of circulation of a plurality of circulators in the plurality of circulator modules is changes such that the standby component is connected to a communicative path through the circulator redundancy network, and the failed component is connected to an open path through the circulator redundancy network.

EXAMPLE EMBODIMENTS

Example 1 includes a circulator redundancy network, the circulator redundancy network comprising: a plurality of inputs; a plurality of outputs; a plurality of circulator modules configured to connect the plurality of inputs to the plurality of outputs, wherein a circulator module in the plurality of circulator modules comprises: at least one module input connected to at least one input in the plurality of inputs; at least one module output, wherein the number of module outputs in the at least one module output equals the number of module inputs in the at least one module input; a plurality of interconnection ports, configured to connect the circulator module to other circulator modules in the plurality of circulator modules; and a plurality of circulators configurable to route received signals between the at least one input, the at least one output, and the plurality of interconnection ports; a plurality of interconnects configured to connect the plurality of circulator modules to one another, wherein an interconnect connects to an interconnection port; and a circulator switch controller, configured to control the direction of circulation for the plurality of circulators in the plurality of circulator modules.

Example 2 includes the circulator redundancy network of Example 1, further comprising at least one modified circulator module, wherein a modified circulator module comprises: at least one modified input; an interconnection port to connect to a proximate circulator module in the plurality of circulator modules; and at least one circulator configured to route received signal between the at least one modified input and the interconnection port.

Example 3 includes the circulator redundancy network of any of Examples 1-2, wherein a circulator module further includes a plurality of matched loads that are configured to absorb reflected signals.

Example 4 includes the circulator redundancy network of any of Examples 1-3, wherein the circulator module further includes at least one cross-over, wherein a first section in the circulator module includes an E-plane transition to cross a second section in the circulator module where the first section and the second section are located in different E-planes where the first section crosses the second section.

Example 5 includes the circulator redundancy network of any of Examples 1-4, wherein three circulators in the plurality of circulators are arranged in a triad.

Example 6 includes the circulator redundancy network of any of Examples 1-5, wherein an excess module output connects to a matched load, wherein an excess module output occurs when the number of inputs exceeds the number of outputs and an excess module output is a module output that is not connected to an output.

Example 7 includes the circulator redundancy network of any of Examples 1-6, wherein the circulator switch controller controls the direction of circulation by providing a high current pulse through a magnetizing winding that passes through an aperture in at least one circulator in the plurality of circulators.

Example 8 includes the circulator redundancy network of any of Examples 1-7, wherein an end interconnection port connects to a matched load, the end interconnection port being a part of an end circulator module connected to a single circulator module in the plurality of circulator modules.

Example 9 includes a system, the system comprising: a plurality of components; a first circulator redundancy network, wherein the first circulator redundancy network comprises: a first plurality of inputs; a first plurality of outputs, wherein each output in the first plurality of outputs is connected to a respective component in the plurality of components and the number of outputs in the first plurality of outputs is greater than the number of inputs in the first plurality of inputs; and a first plurality of circulator modules, wherein a circulator module in the first plurality of circulator modules comprises a first plurality of circulators that are configurable to route received signals between at least one input in the first plurality of inputs, at least one output in the first plurality of outputs and another circulator module in the first plurality of circulator modules; a second circulator redundancy network, wherein the second circulator redundancy network comprises: a second plurality of inputs; a second plurality of outputs, wherein each input in the second plurality of inputs is connected to a respective component in the plurality of components and the number of inputs in the second plurality of inputs is greater than the number of outputs in the second plurality of inputs; and a second plurality of circulator modules, wherein a circulator module in the second plurality of circulator modules comprises a second plurality of circulators that are configurable to route received signals between at least one input in the second plurality of inputs, at least one output in the second plurality of outputs and another circulator module in the second plurality of circulator modules; and a circulator switch controller configured to control a direction of circulation for the first plurality of circulators and the second plurality of circulators such that the first plurality of inputs and the second plurality of outputs are communicatively connected to a subset of the plurality of components.

Example 10 includes the system of Example 9, wherein the circulator module in the first plurality of circulator modules connects to another circulator module in the first plurality of circulator modules through at least one first interconnection port; and wherein the circulator module in the second plurality of circulator modules connects to another circulator module in the second plurality of circulator modules through at least one second interconnection port.

Example 11 includes the system of any of Examples 9-10, wherein a direction of circulation for a circulator in the first plurality of circulators or the second plurality of circulators is controlled by at least one of: a magnetized winding that extends through an aperture through a switching element in the circulator; a magnetic field produced by a magnetic field source that is outside the circulator.

Example 12 includes the system of any of Examples 9-11, wherein at least one circulator module in the first plurality of circulators and the second plurality of circulators comprises a plurality of matched loads that are configured to absorb reflected signals.

Example 13 includes the system of any of Examples 9-12, wherein at least one circulator module in the first plurality of circulators and the second plurality of circulators comprises at least one cross-over, wherein a first section in the at least one circulator includes an E-plane transition to cross a second section in the at least one circulator where the first section and the second section are located in different E-planes where the first section crosses the second section.

Example 14 includes the system of any of Examples 9-13, wherein at least three switchable circulators in the first plurality of circulators and the second plurality of circulators are arranged in a triad.

Example 15 includes the system of any of Examples 9-14, wherein at least one circulator in the first plurality of circulator modules or the second plurality of circulator modules is a fixed bias circulator.

Example 16 includes the system of any of Examples 9-15, wherein a component in the plurality of components is a low noise amplifier.

Example 17 includes a method for switching communication paths in a circulator redundancy network; the method comprising: identifying a failed component, wherein the failed component is connected to a communicative path through the circulator redundancy network, the circulator redundancy comprising a plurality of circulator modules, wherein a circulator module comprises: a plurality of circulators that are configurable to route received signals through the circulator redundancy network along a plurality of communication paths by connecting with other circulator modules in the plurality of circulator modules; identifying a standby component, wherein the failed component is connected to an open path through the circulator redundancy network; changing a direction of circulation of the plurality of circulators in the plurality of circulator modules such that the standby component is connected to a communicative path through the circulator redundancy network, and the failed component is connected to an open path through the circulator component.

Example 18 includes the method of Example 17, wherein changing the direction of circulation comprises sending a high current electrical pulse to a circulator in the plurality of circulators.

Example 19 includes the method of any of Examples 17-18, further comprising absorbing reflected signals with a plurality of matched loads in the plurality of circulator modules.

Example 20 includes the method of any of Examples 17-19, further comprising transitioning a section in the plurality of circulator modules from a first E-plane to a second E-plane.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A circulator redundancy network, the circulator redundancy network comprising:
a plurality of inputs;
a plurality of outputs;
a plurality of circulator modules configured to connect the plurality of inputs to the plurality of outputs, wherein a circulator module in the plurality of circulator modules comprises:
at least one module input connected to at least one input in the plurality of inputs;
at least one module output, wherein the number of module outputs in the at least one module output equals the number of module inputs in the at least one module input;
a plurality of interconnection ports configured to connect the circulator module to other circulator modules in the plurality of circulator modules; and
a plurality of circulators configurable to route received signals between the at least one input, the at least one output, and the plurality of interconnection ports;
a plurality of interconnects configured to connect the plurality of circulator modules to one another, wherein an interconnect connects to an interconnection port; and
a circulator switch controller, configured to control the direction of circulation for the plurality of circulators in the plurality of circulator modules.

2. The circulator redundancy network of claim 1, further comprising at least one modified circulator module, wherein a modified circulator module comprises:
at least one modified input;
an interconnection port to connect to a proximate circulator module in the plurality of circulator modules; and
at least one circulator configured to route received signals between the at least one modified input and the interconnection port.

3. The circulator redundancy network of claim 1, wherein the circulator module further includes a plurality of matched loads that are configured to absorb reflected signals.

4. The circulator redundancy network of claim 1, wherein the circulator module further includes at least one cross-over, wherein a first section in the circulator module includes an E-plane transition to cross a second section in the circulator module, where the first section and the second section are located in different E-planes, where the first section crosses the second section.

5. The circulator redundancy network of claim 1, wherein three circulators in the plurality of circulators are arranged in a triad.

6. The circulator redundancy network of claim 1, wherein an excess module output connects to a matched load, wherein an excess module output occurs when the number of inputs exceeds the number of outputs and an excess module output is a module output that is not connected to an output.

7. The circulator redundancy network of claim 1, wherein the circulator switch controller controls the direction of circulation by providing a high current pulse through a magnetizing winding that passes through an aperture in at least one circulator in the plurality of circulators.

8. The circulator redundancy network of claim 1, wherein an end interconnection port connects to a matched load, the end interconnection port being a part of an end circulator module connected to a single circulator module in the plurality of circulator modules.

9. A system, the system comprising:
a plurality of components;
a first circulator redundancy network, wherein the first circulator redundancy network comprises:
a first plurality of inputs;
a first plurality of outputs, wherein each output in the first plurality of outputs is connected to a respective component in the plurality of components and the number of outputs in the first plurality of outputs is greater than the number of inputs in the first plurality of inputs; and
a first plurality of circulator modules, wherein a circulator module in the first plurality of circulator modules comprises a first plurality of circulators that are configurable to route received signals between at least one input in the first plurality of inputs, at least one output in the first plurality of outputs and another circulator module in the first plurality of circulator modules;
a second circulator redundancy network, wherein the second circulator redundancy network comprises:
a second plurality of inputs;
a second plurality of outputs, wherein each input in the second plurality of inputs is connected to a respective component in the plurality of components and the number of inputs in the second plurality of inputs is greater than the number of outputs in the second plurality of inputs; and
a second plurality of circulator modules, wherein a circulator module in the second plurality of circulator modules comprises a second plurality of circulators that are configurable to route received signals between at least one input in the second plurality of inputs, at least one output in the second plurality of outputs and another circulator module in the second plurality of circulator modules; and
a circulator switch controller configured to control a direction of circulation for the first plurality of circulators and the second plurality of circulators such that the first plurality of inputs and the second plurality of outputs are communicatively connected to a subset of the plurality of components.

10. The system of claim 9, wherein the circulator module in the first plurality of circulator modules connects to another circulator module in the first plurality of circulator modules through at least one first interconnection port; and
wherein the circulator module in the second plurality of circulator modules connects to another circulator module in the second plurality of circulator modules through at least one second interconnection port.

11. The system of claim 9, wherein a direction of circulation for a circulator in the first plurality of circulators or the second plurality of circulators is controlled by at least one of:
a magnetized winding that extends through an aperture through a switching element in the circulator; and
a magnetic field produced by a magnetic field source that is outside the circulator.

12. The system of claim 9, wherein at least one circulator module in the first plurality of circulators and the second plurality of circulators comprises a plurality of matched loads that are configured to absorb reflected signals.

13. The system of claim 9, wherein at least one circulator module in the first plurality of circulator modules and the second plurality of circulator modules comprises at least one cross-over, wherein a first section in the at least one circulator module includes an E-plane transition to cross a second section in the at least one circulator module, where the first section and the second section are located in different E-planes, where the first section crosses the second section.

14. The system of claim 9, wherein at least three switchable circulators in the first plurality of circulators and the second plurality of circulators are arranged in a triad.

15. The system of claim 9, wherein at least one circulator in the first plurality of circulator modules or the second plurality of circulator modules is a fixed bias circulator.

16. The system of claim 9, wherein a component in the plurality of components is a low noise amplifier.

17. A method for switching communication paths in a circulator redundancy network; the method comprising:
   identifying a failed component, wherein the failed component is connected to a communicative path through the circulator redundancy network, the circulator redundancy network comprising a plurality of circulator modules, wherein a circulator module comprises:
      a plurality of circulators that are configurable to route received signals through the circulator redundancy network along a plurality of communication paths by connecting with other circulator modules in the plurality of circulator modules;
   identifying a standby component, wherein the failed component is connected to an open path through the circulator redundancy network;
   changing a direction of circulation of the plurality of circulators in the plurality of circulator modules such that the standby component is connected to a communicative path through the circulator redundancy network, and the failed component is connected to an open path through the circulator redundancy network.

18. The method of claim 17, wherein changing the direction of circulation comprises sending a high current electrical pulse to a circulator in the plurality of circulators.

19. The method of claim 17, further comprising absorbing reflected signals with a plurality of matched loads in the plurality of circulator modules.

20. The method of claim 17, further comprising transitioning a section in the plurality of circulator modules from a first E-plane to a second E-plane.

* * * * *